United States Patent
Cavender et al.

(10) Patent No.: US 9,410,388 B2
(45) Date of Patent: Aug. 9, 2016

(54) ACOUSTIC GENERATOR AND ASSOCIATED METHODS AND WELL SYSTEMS

(71) Applicant: HALLIBURTON ENERGY SERVICES, INC., Houston, TX (US)

(72) Inventors: Travis W. Cavender, Angleton, TX (US); Roger L. Schultz, Ninnekah, OK (US); Daniel D. Gleitman, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 14/307,709

(22) Filed: Jun. 18, 2014

(65) Prior Publication Data
US 2014/0313855 A1 Oct. 23, 2014

Related U.S. Application Data

(62) Division of application No. 13/647,035, filed on Oct. 8, 2012, now Pat. No. 8,813,838, which is a division of application No. 12/834,971, filed on Jul. 13, 2010.

(60) Provisional application No. 61/225,311, filed on Jul. 14, 2009.

(51) Int. Cl.
*E21B 28/00* (2006.01)
*E21B 43/04* (2006.01)
(Continued)

(52) U.S. Cl.
CPC .............. *E21B 28/00* (2013.01); *E21B 33/13* (2013.01); *E21B 43/003* (2013.01); *E21B 43/04* (2013.01);
(Continued)

(58) Field of Classification Search
CPC ........ E21B 43/003; E21B 28/00; E21B 43/04; E21B 49/00; E21B 47/14; E21B 33/13; G01V 1/04; G01V 1/40
USPC ................... 166/177.1, 177.6, 278; 367/25
See application file for complete search history.

(56) References Cited

U.S. PATENT DOCUMENTS

| 2,072,982 | A | 3/1937 | Dale |
| 3,754,598 | A | 8/1973 | Holloway, Jr. |

(Continued)

FOREIGN PATENT DOCUMENTS

| EP | 2491357 | 8/2012 |
| WO | 2009073475 A2 | 6/2009 |

OTHER PUBLICATIONS 3M, 3M Glass Bubbles, HGS Series, dated Apr. 2009, 4 pages.
(Continued)

*Primary Examiner* — Michael Wills, III
(74) *Attorney, Agent, or Firm* — Schwegman, Lundberg & Woessner, P.A.; Craig W. Roddy

(57) ABSTRACT

A well system and associated method can include an acoustic generator which can be used to excite a formation with acoustic waves transmitted from the acoustic generator. Another well system and associated method can include an acoustic generator which can transmit acoustic waves into cement surrounding a casing. Another well system and associated method can include an acoustic generator which can be used to transmit acoustic waves into an annulus surrounding a well screen during or after a gravel packing operation. Another well system and associated method can include an acoustic generator which can be connected in a drill string in close proximity to a drill bit, with the acoustic generator transmitting acoustic waves into a formation ahead of the bit.

16 Claims, 13 Drawing Sheets

(51) Int. Cl.

| | | |
|---|---|---|
| *E21B 33/13* | (2006.01) | |
| *E21B 43/00* | (2006.01) | |
| *E21B 43/267* | (2006.01) | |
| *E21B 47/14* | (2006.01) | |
| *E21B 49/00* | (2006.01) | |
| *G01V 1/40* | (2006.01) | |
| *E21B 7/24* | (2006.01) | |

(52) U.S. Cl.
CPC ............... *E21B 43/267* (2013.01); *E21B 47/14* (2013.01); *E21B 49/00* (2013.01); *G01V 1/40* (2013.01); *E21B 7/24* (2013.01)

(56) References Cited

U.S. PATENT DOCUMENTS

| | | | | |
|---|---|---|---|---|
| 3,830,294 | A | * | 8/1974 | Swanson, Jr. ................... 166/51 |
| 4,093,028 | A | | 6/1978 | Brandon |
| 4,391,337 | A | | 7/1983 | Ford et al. |
| 4,417,621 | A | | 11/1983 | Medlin et al. |
| 4,512,401 | A | | 4/1985 | Bodine |
| 4,548,271 | A | | 10/1985 | Keller |
| 4,640,360 | A | | 2/1987 | Bodine et al. |
| 4,653,587 | A | | 3/1987 | Bodine |
| 4,658,897 | A | | 4/1987 | Kompanek et al. |
| 4,665,980 | A | * | 5/1987 | Bodine ......................... 166/249 |
| 4,683,951 | A | | 8/1987 | Pathak et al. |
| 4,687,491 | A | | 8/1987 | Latty |
| 4,696,343 | A | | 9/1987 | Anderson et al. |
| 4,736,794 | A | | 4/1988 | Bodine |
| 4,783,585 | A | | 11/1988 | Meshekow |
| 4,950,454 | A | | 8/1990 | Masuda et al. |
| 5,152,342 | A | | 10/1992 | Rankin et al. |
| 5,273,114 | A | * | 12/1993 | Wicks et al. ................... 166/278 |
| 5,396,955 | A | | 3/1995 | Howlett |
| 5,460,223 | A | | 10/1995 | Economides |
| 5,524,709 | A | | 6/1996 | Withers |
| 5,623,576 | A | | 4/1997 | Deans |
| 5,836,393 | A | | 11/1998 | Johnson |
| 5,984,578 | A | | 11/1999 | Hanesian et al. |
| 6,098,516 | A | | 8/2000 | Gazonas |
| 6,230,802 | B1 | * | 5/2001 | Duhon ......................... 166/278 |
| 6,390,191 | B1 | | 5/2002 | Melson et al. |
| 6,405,797 | B2 | | 6/2002 | Davidson et al. |
| 6,460,618 | B1 | | 10/2002 | Braithwaite et al. |
| 6,467,542 | B1 | | 10/2002 | Kostrov et al. |
| 6,619,394 | B2 | | 9/2003 | Soliman et al. |
| 6,691,778 | B2 | | 2/2004 | Cole et al. |
| 6,729,407 | B2 | * | 5/2004 | Stoesz ......................... 166/301 |
| 6,814,141 | B2 | | 11/2004 | Huh et al. |
| 6,962,203 | B2 | | 11/2005 | Funchess |
| 7,114,560 | B2 | | 10/2006 | Nguyen et al. |
| 7,139,219 | B2 | | 11/2006 | Kollé et al. |
| 7,219,732 | B2 | | 5/2007 | Reddy |
| 7,318,471 | B2 | * | 1/2008 | Rodney et al. ............ 166/250.01 |
| 7,350,567 | B2 | | 4/2008 | Stolarczyk et al. |
| 7,434,623 | B2 | | 10/2008 | Von Gynz-Rekowski |
| 7,770,638 | B2 | * | 8/2010 | Kabishcher et al. .......... 166/249 |
| 7,819,181 | B2 | | 10/2010 | Entov et al. |
| 8,047,282 | B2 | | 11/2011 | Lewis et al. |
| 8,127,832 | B1 | | 3/2012 | Bond |
| 8,813,838 | B2 | | 8/2014 | Cavender et al. |
| 2002/0070017 | A1 | | 6/2002 | Soliman et al. |
| 2002/0195246 | A1 | | 12/2002 | Davidson |
| 2003/0042018 | A1 | | 3/2003 | Huh et al. |
| 2004/0173352 | A1 | * | 9/2004 | Mullen et al. ................. 166/278 |
| 2004/0211560 | A1 | * | 10/2004 | Richard et al. ................. 166/278 |
| 2005/0028983 | A1 | | 2/2005 | Lehman et al. |
| 2005/0098314 | A1 | | 5/2005 | Pope et al. |
| 2005/0189108 | A1 | | 9/2005 | Davidson |
| 2005/0239661 | A1 | | 10/2005 | Pfefferle |
| 2006/0042794 | A1 | | 3/2006 | Pfefferle |
| 2006/0086503 | A1 | | 4/2006 | Reddy et al. |
| 2006/0108111 | A1 | | 5/2006 | Kas'yanov |
| 2006/0131012 | A1 | | 6/2006 | Blauch et al. |
| 2007/0019737 | A1 | | 1/2007 | Koto et al. |
| 2007/0064539 | A1 | * | 3/2007 | Han et al. ........................ 367/189 |
| 2007/0187090 | A1 | * | 8/2007 | Nguyen et al. ................. 166/249 |
| 2007/0187112 | A1 | | 8/2007 | Eddison et al. |
| 2007/0193737 | A1 | | 8/2007 | Miller et al. |
| 2008/0041591 | A1 | | 2/2008 | Reddy et al. |
| 2008/0073079 | A1 | | 3/2008 | Tranquilla et al. |
| 2008/0105426 | A1 | | 5/2008 | Di et al. |
| 2009/0003131 | A1 | | 1/2009 | Meyer |
| 2009/0008088 | A1 | | 1/2009 | Schultz et al. |
| 2009/0008096 | A1 | | 1/2009 | Schultz et al. |
| 2009/0065197 | A1 | * | 3/2009 | Eslinger ................ E21B 43/003 |
| | | | | 166/249 |
| 2009/0159282 | A1 | | 6/2009 | Webb et al. |
| 2009/0159361 | A1 | | 6/2009 | Coates et al. |
| 2009/0200019 | A1 | | 8/2009 | Delacroix et al. |
| 2009/0288820 | A1 | | 11/2009 | Barron et al. |
| 2010/0044032 | A1 | | 2/2010 | Kabishcher et al. |
| 2011/0011576 | A1 | | 1/2011 | Cavender et al. |
| 2011/0030467 | A1 | * | 2/2011 | Bakulin ......................... 73/152.32 |
| 2011/0094732 | A1 | * | 4/2011 | Lehman et al. ................. 166/249 |
| 2013/0037259 | A1 | | 2/2013 | Cavender et al. |

OTHER PUBLICATIONS

Groves; W.G. (Bill), How Acoustic Stimulation Works, dated Mar. 12, 2004, 3 pages.

Pride, Steve; Flekkoy, Eirik G.; Aursjo, Olav; Enhanced Oil Recovery, dated Jun. 2009, 8 pages.

Authors Not Named, Oil & Gas—Maximising Recovery Programme (formerly SHARP) IOR Views, Issue 9, dated Nov. 2004, 5 pages, published by Department of Trade and Industry and Consents Unit.

Clean Well Tools Ltd., Tools, dated Jun. 4, 2009, 2 pages.

Office Action issued Aug. 17, 2012 for U.S. Appl. No. 12/834,971, 19 pages.

Office Action issued Dec. 27, 2013 for U.S. Appl. No. 12/834,971, 14 pages.

Office Action issued Feb. 15, 2013 for U.S. Appl. No. 13/647,035, 21 pages.

Office Action issued Dec. 27, 2013 for U.S. Appl. No. 13/647,035, 7 pages.

"U.S. Appl. No. 12/834,971, Examiner Interview Summary mailed Jan. 2, 2013", 3 pgs.

"U.S. Appl. No. 12/834,971, Examiner Interview Summary mailed May 7, 2014", 3 pgs.

"U.S. Appl. No. 12/834,971, Examiner Interview Summary mailed Jul. 27, 2012", 3 pgs.

"U.S. Appl. No. 12/834,971, Final Office Action mailed Jul. 24, 2015", 11 pgs.

"U.S. Appl. No. 12/834,971, Final Office Action mailed Dec. 2, 2014", 7 pgs.

"U.S. Appl. No. 12/834,971, Non Final Office Action mailed Feb. 5, 2015", (8 pgs).

"U.S. Appl. No. 12/834,971, Non Final Office Action mailed Jun. 12, 2014", 8 pgs.

"U.S. Appl. No. 12/834,971, Non Final Office Action mailed Oct. 2, 2015", 7 pgs.

"U.S. Appl. No. 12/834,971, Response filed Jan. 13, 2015 to Final Office Action mailed Dec. 2, 2014", 10 pgs.

"U.S. Appl. No. 12/834,971, Response filed Feb. 24, 2012 to Non Final Office Action mailed Dec. 27, 2013", 0 pgs.

"U.S. Appl. No. 12/834,971, Response filed Mar. 1, 2016 to Non Final Office Action mailed Oct. 2, 2015", 11 pgs.

"U.S. Appl. No. 12/834,971, Response filed Apr. 8, 2015 to Non Final Office Action mailed Feb. 5, 2015", 9 pgs.

"U.S. Appl. No. 12/834,971, Response filed Aug. 11, 2014 to Non Final Office Action mailed Jun. 12, 2014", 8 pgs.

"U.S. Appl. No. 12/834,971, Response filed Aug. 17, 2015 to Final Office Action mailed Jul. 24, 2015", 9 pgs.

"U.S. Appl. No. 12/834,971, Response filed Nov. 15, 2012 to Non Final Office Action mailed Aug. 17, 2012", 12 pgs.

* cited by examiner

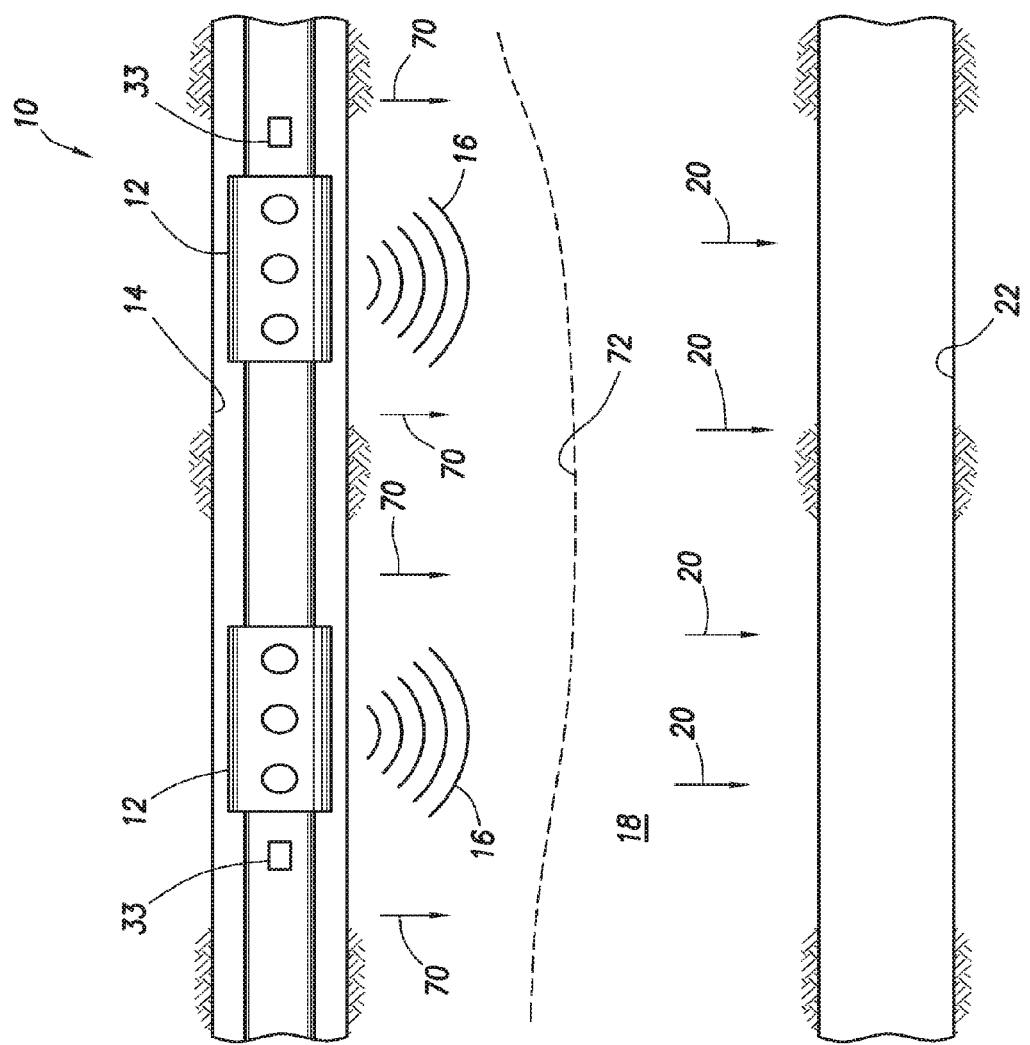

ACOUSTIC GENERATOR AND ASSOCIATED METHODS AND WELL SYSTEMS

CROSS-REFERENCE TO RELATED APPLICATIONS

This application is a division of prior application Ser. No. 13/647,035 filed on 8 Oct. 2012, which is a division of prior application Ser. No. 12/834,971 filed on 13 Jul. 2010, which claims the benefit under 35 USC §119 of the filing date of provisional application No. 61/225,311 filed on Jul. 14, 2009. The entire disclosures of these prior applications are incorporated herein by this reference.

BACKGROUND

This disclosure relates generally to equipment utilized and operations performed in conjunction with a subterranean well and, in an example described below, more particularly provides an acoustic generator and associated methods and well systems.

Hydrocarbons in the earth are generally contained within pores of formation rock having varying degrees of permeability. Sometimes the hydrocarbons do not readily flow toward a wellbore for production for various reasons, such as, low formation permeability, high viscosity, etc.

In the past, hydraulic fracturing has been used to form fractures in formations and thereby expose more surface area of the formations, and stimulation treatments (such as acidizing, etc.) have been used to enhance flow of hydrocarbons from formations to wellbores, but these techniques have disadvantages. For example, hydraulic fracturing requires large quantities of fluid to be pumped into a formation, the resulting fractures can unintentionally intersect undesirable zones (such as water or gas zones), very specialized and expensive surface equipment is required for fracturing and acidizing, etc.

Therefore, it may be seen that improvements are needed. The improvements described below can be useful in enhancing flow of hydrocarbons or other fluids, investigating formation characteristics, communicating in wells, and for other purposes.

SUMMARY

In the disclosure below, a downhole acoustic generator and associated methods and well systems are provided to the art. One example is described below in which an acoustic generator is used to enhance production of fluid into a wellbore. Another example is described below in which an acoustic generator is used to investigate characteristics of a formation.

In one aspect, a well system and associated method are provided in which an acoustic generator is used to excite a formation with acoustic waves transmitted from the acoustic generator.

In another aspect, a well system and associated method are provided in which an acoustic generator transmits acoustic waves into cement surrounding a casing. The casing may be coated with a hardening agent, or the hardening agent may be contained in containers. The casing may be run into the well, the cement may be pumped into place in an annulus, and then the hardening agent may be mixed with the cement using acoustic waves transmitted by an acoustic generator. The hardening agent may be dispersed and mixed with a cement using an acoustic generator, no matter what release mechanism is used. The hardening agent may be released as a result of heating the cement using acoustic waves, and/or the cement may be cured using heat from the acoustic waves.

In yet another aspect, a well system and associated method are provided in which an acoustic generator is used to transmit acoustic waves into an annulus surrounding a well screen during or after a gravel packing operation.

In a further aspect, a well system and associated method are provided in which an acoustic generator is connected in a drill string in close proximity to a drill bit, the acoustic generator transmitting acoustic waves into a formation ahead of the bit.

Another aspect includes a well system and method in which acoustic waves are transmitted into a formation during a fracturing process which includes proppant, thereby increasing depth of penetration and/or density of proppant (e.g. sand, ceramics, etc.) flowed into the fracture(s), resulting in increased or deeper propping and increased conductivity of the propped fracture(s).

Another aspect includes a well system and method in which acoustic waves transmitted into a formation increases wetting and mixing of conformance agents such as relative permeability modifiers, thereby improving rejection of water and/or gas from entry to the near wellbore region or fractures in the formation and improving oil production or production ratios.

Another aspect includes a well system and method in which acoustic waves are transmitted into a formation near a zone of production or higher, semi-permanently for inhibition or as an intervention for remediation, of flow assurance problems such as hydrates, scale, wax, or asphaltine formations, in the near well production zone or in a completion or tubulars.

The acoustic generator can include a vibration isolation device (e.g., a high damping material, mechanical filter, etc.) between the acoustic generator and the string on which it is conveyed, to protect the string. The acoustic generator may be used in conjunction with an isolator section of casing, or such section of other tubular strings, which are above or below the zone in which the device is intended to be used, to similarly reflect or attenuate the acoustic energy traveling up or down the wellbore with potentially negative effects. Elastomeric packers may be preferred to bound the zone being acoustically stimulated, having natural damping tendencies. The system may include one or more sensors within, or proximate, or distant, from the acoustic generator for real time feedback of its output, and/or vibratory response of intended target and/or of elements not desired to be excited, for real time tuning of amplitude, frequency, etc.

Also provided is a well system and method in which, while stimulating via one wellbore, returns are taken from an adjacent wellbore, whereby pore pressure relief attracts a propagation plane toward the adjacent wellbore. Controlled pore pressure relief can enhance the effect of the acoustic waves.

A well system and method are also provided in which, after a well is initially fractured, an acoustic generator is used to excite or re-excite an existing fracture geometry.

A further well system and method are provided in which a formation is excited by acoustic waves generated by an acoustic generator in several places across a generally horizontal wellbore, whereby the position or areas where a steam chamber develops in a SAGD system is selected.

These and other features, advantages and benefits will become apparent to one of ordinary skill in the art upon careful consideration of the detailed description of representative examples below and the accompanying drawings, in which similar elements are indicated in the various figures using the same reference numbers.

BRIEF DESCRIPTION OF THE DRAWINGS

FIG. 16 is a schematic partially cross-sectional view of another configuration of the well system.

DETAILED DESCRIPTION

Figure 1:
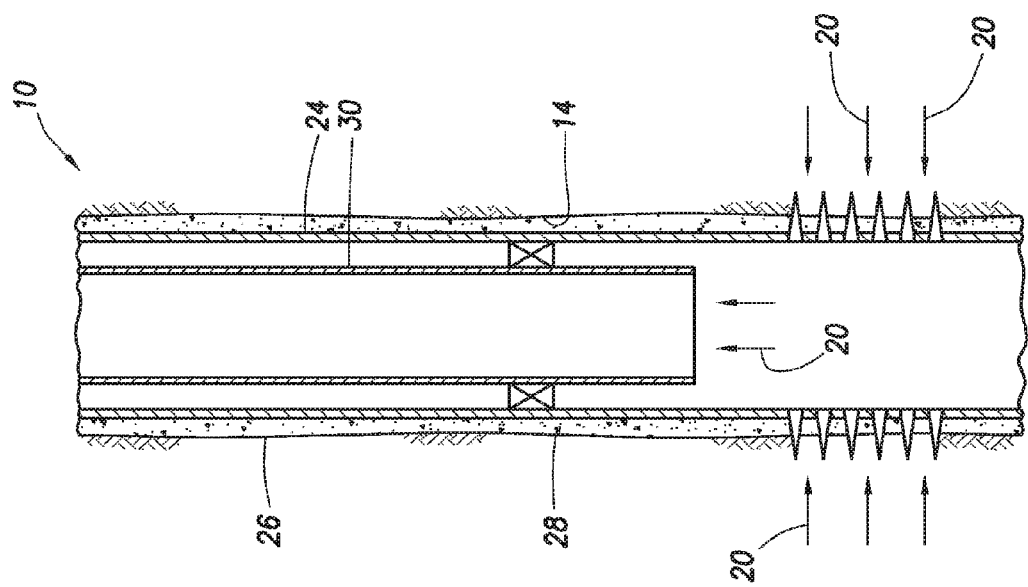
FIG. 1 is a schematic partially cross-sectional view of a well system and associated method which embody principles of the present disclosure.

Representatively illustrated in FIG. 1 is a well system 10 and associated method which embody principles of this disclosure. In the well system 10, an acoustic generator 12 is conveyed into a wellbore 14 and is used to transmit acoustic pressure waves 16 into a zone or formation 18 surrounding the wellbore.

One of the purposes of the acoustic generator 12 in the system 10 is to eliminate the need for hydraulic fracturing in traditional porous type reservoirs, as well as shale structure formations. However, hydraulic fracturing could be used, without departing from the principles of this disclosure.

The acoustic generator 12 creates near-field and far-field stimulation effects within the rock matrix of the formation 18. In this scenario, the acoustic generator 12 could be deployed in a producing well (new or previously on production), with the intent of using the acoustic energy of the acoustic waves 16 to disturb and agitate the rock matrix, thereby creating new and enhanced conductivity which enhances the flow of hydrocarbon fluid 20 toward the wellbore 14.

Stimulation fluids (such as acid, etc.) can be flowed into the formation 18 from the wellbore 14 while the acoustic generator 12 transmits the acoustic waves 16 into the formation. In this manner, distribution and penetration of the stimulation fluids into the formation 18 can be enhanced.

Acoustic waves 16 transmitted into the formation 18 during a fracturing process which includes proppant can increase depth of penetration and/or density of proppant (e.g. sand, ceramics, etc) into the fracture(s), resulting in increased or deeper propping and increased conductivity of the propped fracture(s). The acoustic waves 16 can be "tuned" to a resonant frequency of the proppant.

Figure 2:
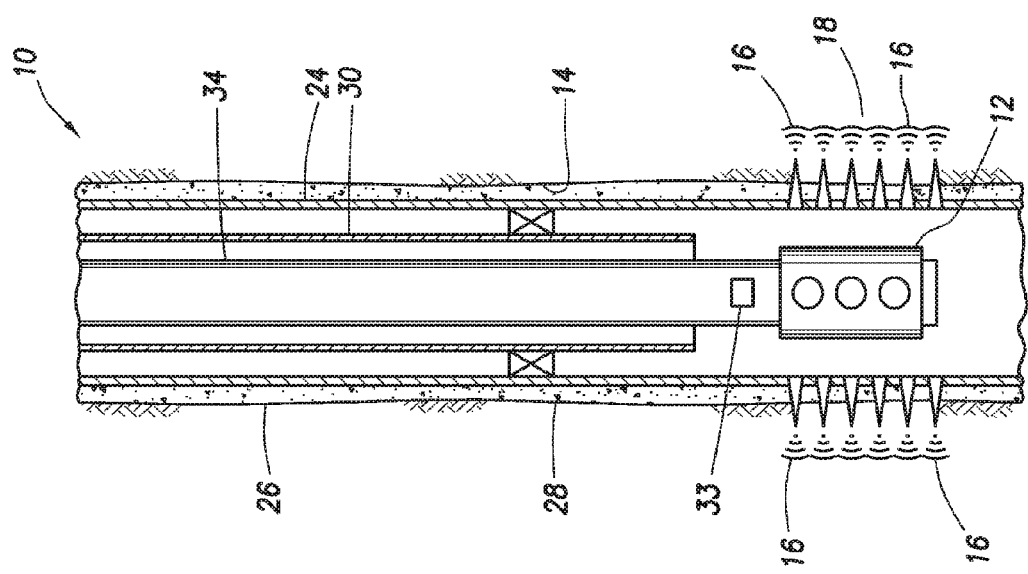
FIG. 2 is a schematic partially cross-sectional view of the well system, in which fluid is received into a wellbore from a formation.
Figure 6:
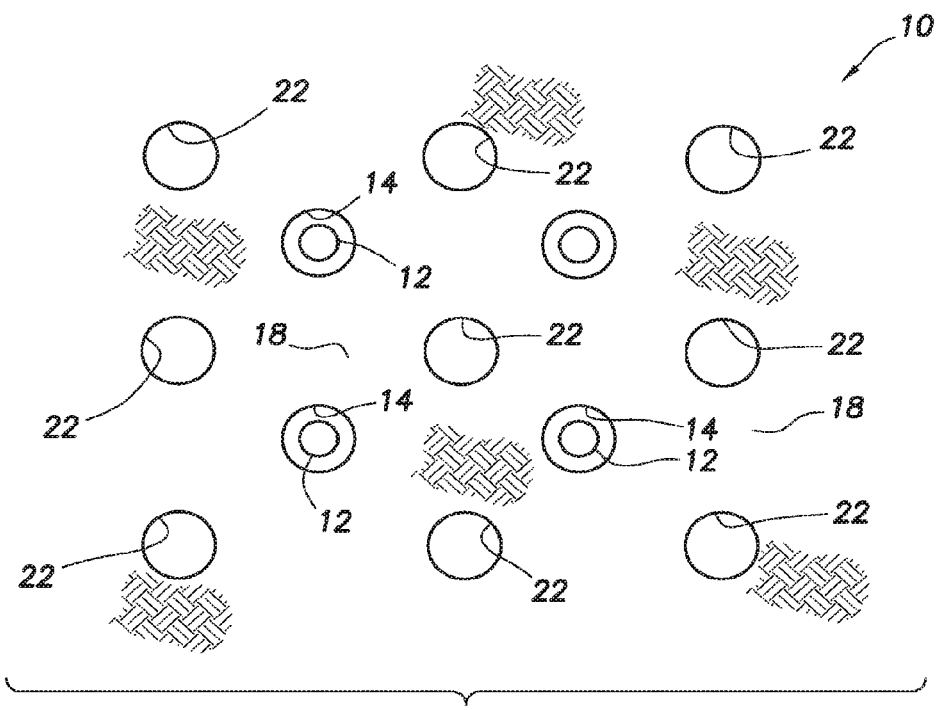
FIG. 6 is a schematic cross-sectional plan view of a distribution of wellbores which may be used in the well system.

In FIG. 2, the system 10 is representatively illustrated after the acoustic waves 16 have stimulated flow of the hydrocarbon fluid 20 toward the wellbore 14, with the acoustic generator 12 retrieved from the well. In a similar method, acoustic generators 12 could be deployed in a well grid strategy (similar to a "5 spot" steamflood design) where wellbores 14 having acoustic generators 12 deployed therein are surrounded by producing wellbores 22 (see FIG. 6, shown from a plan view). The acoustic generators 12 can continue to transmit acoustic waves 16 into the formation 18 while the hydrocarbon fluid 20 is produced from the wellbores 22 surrounding the wellbores 14 in which the acoustic generators are deployed.

Acoustic energy increases wetting and mixing of conformance agents such as relative permeability modifiers, to improve rejection of water or gas from entry to the near wellbore region or fractures in the formation and thereby improve oil production or production ratios.

Figure 7:
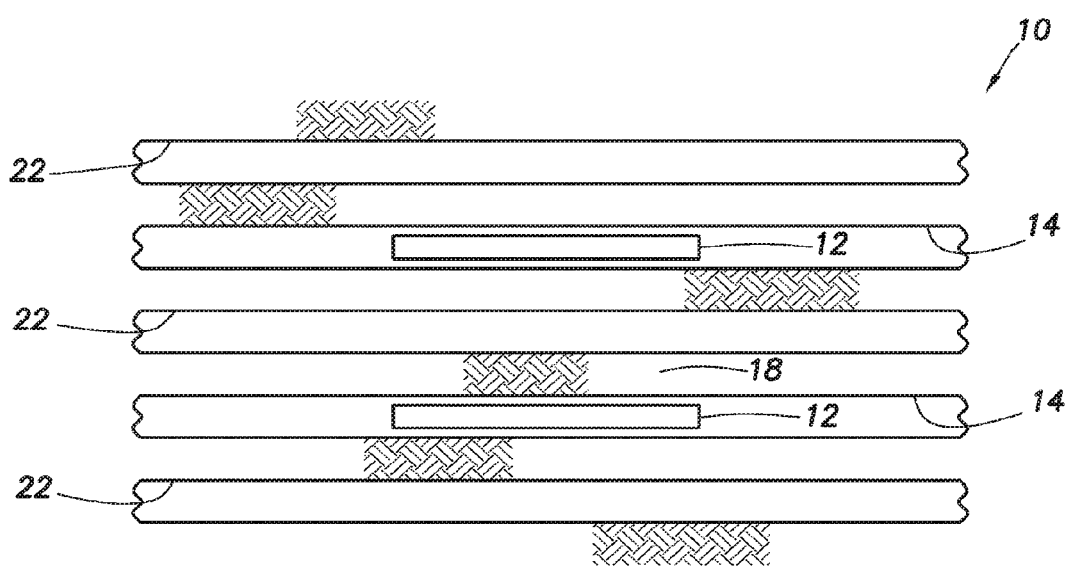
FIG. 7 is a schematic lateral cross-sectional view of a distribution of wellbores which may be used in the well system.

This strategy could be used in horizontal or vertical constructed wellbores. The acoustic energy emanating from the wellbores 14 in which the acoustic generator(s) 12 are deployed excites the natural rock matrix and enhances hydrocarbon recovery into the producing wellbores 22 (see FIG. 7, in which the wellbores 14, 22 are generally horizontal and laterally spaced apart).

Figure 8:
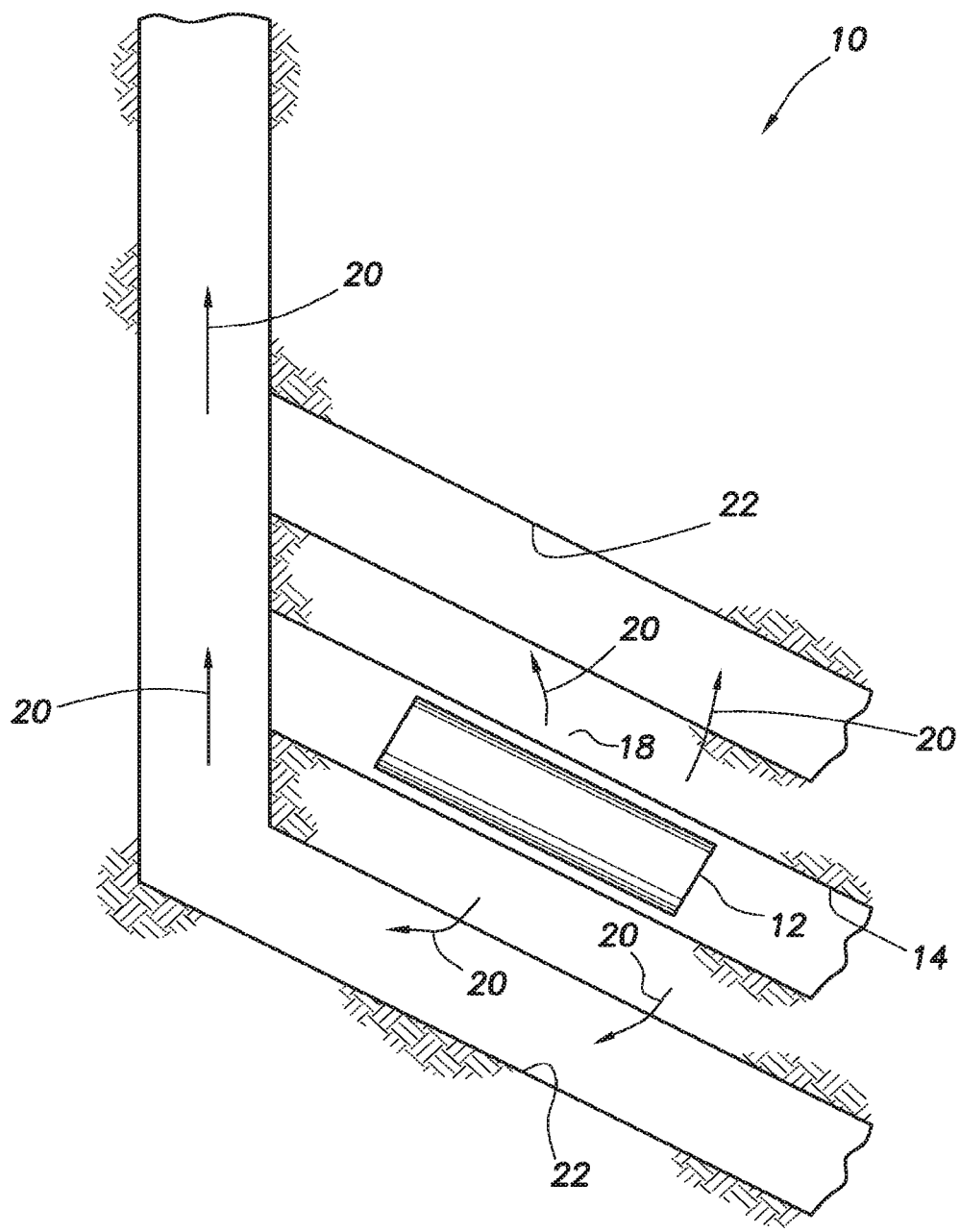
FIG. 8 is a schematic lateral cross-sectional view of another distribution of wellbores which may be used in the well system.

The process could also be used in a multilateral well design from a single surface location where certain laterals (such as wellbore 14, as depicted in FIG. 8) have the acoustic generator 12 deployed therein and other wellbores 22 are used for producing hydrocarbon fluids 20 to the surface. In all of these scenarios, the acoustic generators 12 could be remedially or temporarily deployed within the wellbores 14 using coiled tubing or jointed pipe, or could be permanently installed in the wellbores.

Figure 9:
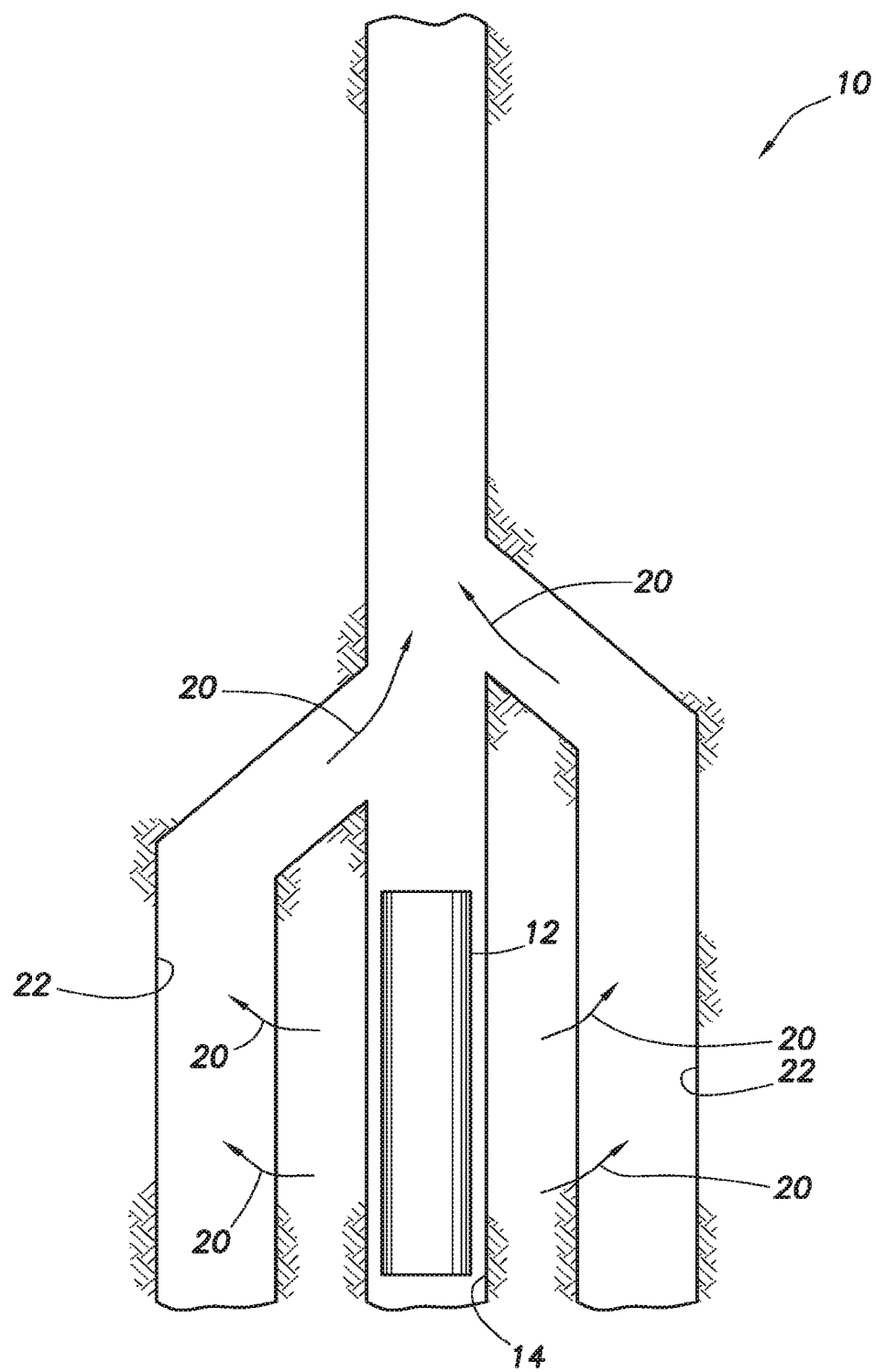
FIG. 9 is yet another schematic lateral cross-sectional view of a distribution of wellbores which may be used in the well system.

In FIG. 9, a combination of the methods described above is used, in which the wellbores 14, 22 are generally horizontal and are laterally spaced apart, with the producing wellbores being multilaterals. Any configuration of producing wellbores 22 and wellbores 14 having the acoustic generator 12 deployed therein may be used, in keeping with the principles of this disclosure.

Figure 3:
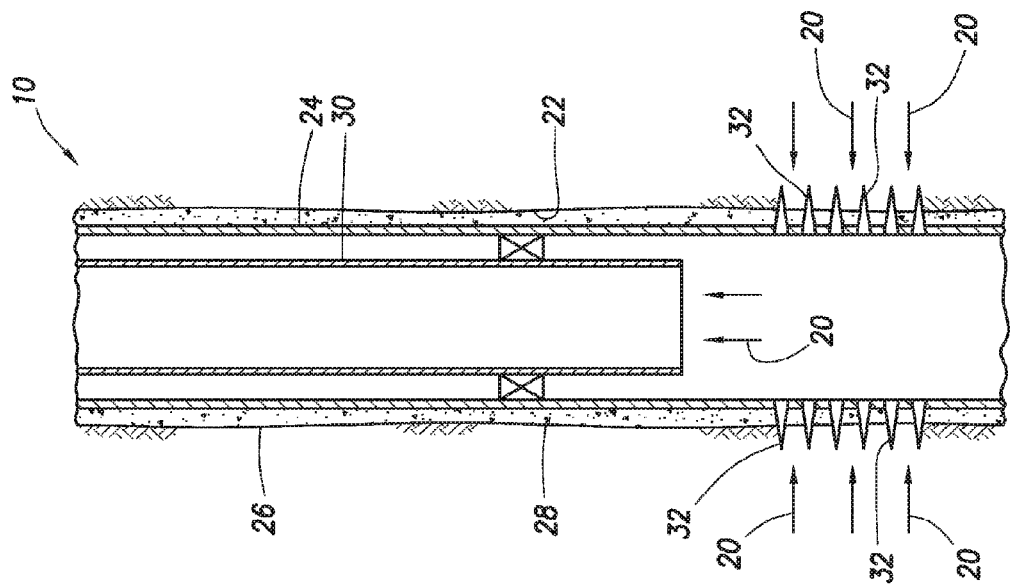
FIG. 3 is a schematic partially cross-sectional view of another configuration of the well system.
Figure 3:
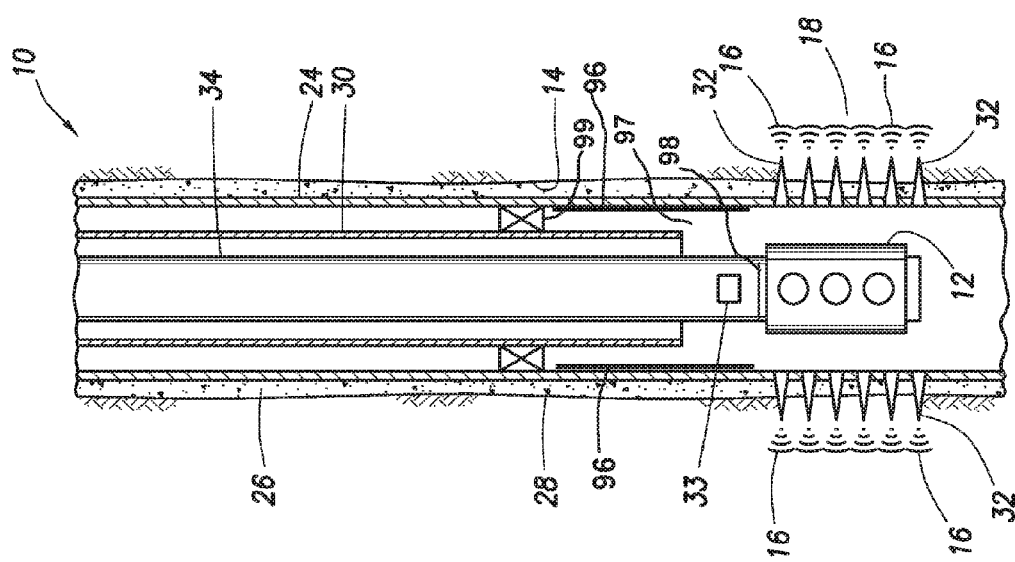

In FIG. 3, the acoustic generator 12 is conveyed into the wellbore 14 which is lined with casing 24 cemented in the wellbore with cement 26 in an annulus 28 formed between the casing 24 and the wellbore. A production tubing string 30 is positioned within the casing 24 and terminates above perforations 32 extending through the casing and cement 26, and into the formation 18.

An adjacent producing wellbore 22 may be similarly configured with casing 24, cement 26, tubing string 30 and perforations 32. However, it should be clearly understood that it is not necessary in keeping with the principles of this disclosure for any of the wellbores 14, 22 to have a particular configuration. For example, any of the wellbores 14, 22 could be uncased or open hole, in which case the casing 24, cement 26 and perforations 32 may not be used.

The acoustic generator 12 is depicted in FIG. 3 as being conveyed on a tubing string 34 (such as a coiled tubing string), but any type of conveyance may be used in any of the configurations of the well system 10 described herein. For example, wireline, casing, liner, jointed tubing, downhole tractors, or any other type of conveyance may be used.

The acoustic generator 12 may be any type of acoustic pressure wave generator. The acoustic generator 12 could generate the acoustic waves 16 due to combustion therein (e.g., by oxidation of a fuel), the acoustic generator could be electrically powered (e.g., using piezoelectric elements, magnetostrictive elements, voice coil or solenoid, a motor, etc.), the acoustic generator could be fluid powered (e.g., using a pressure pulse generated by discharge of fluid from an accumulator, selective cavitation in a fluid flow, otherwise generated pressure pulses such as via the Pulsonics™ tool available from Halliburton Energy Services, Inc.), the acoustic generator could utilize an acoustic dipole (e.g., wherein fluid is alternately discharged and received in a chamber), and the acoustic generator could be positioned at any location (e.g., downhole, at the earth's surface, subsea, etc.).

Figure 10:
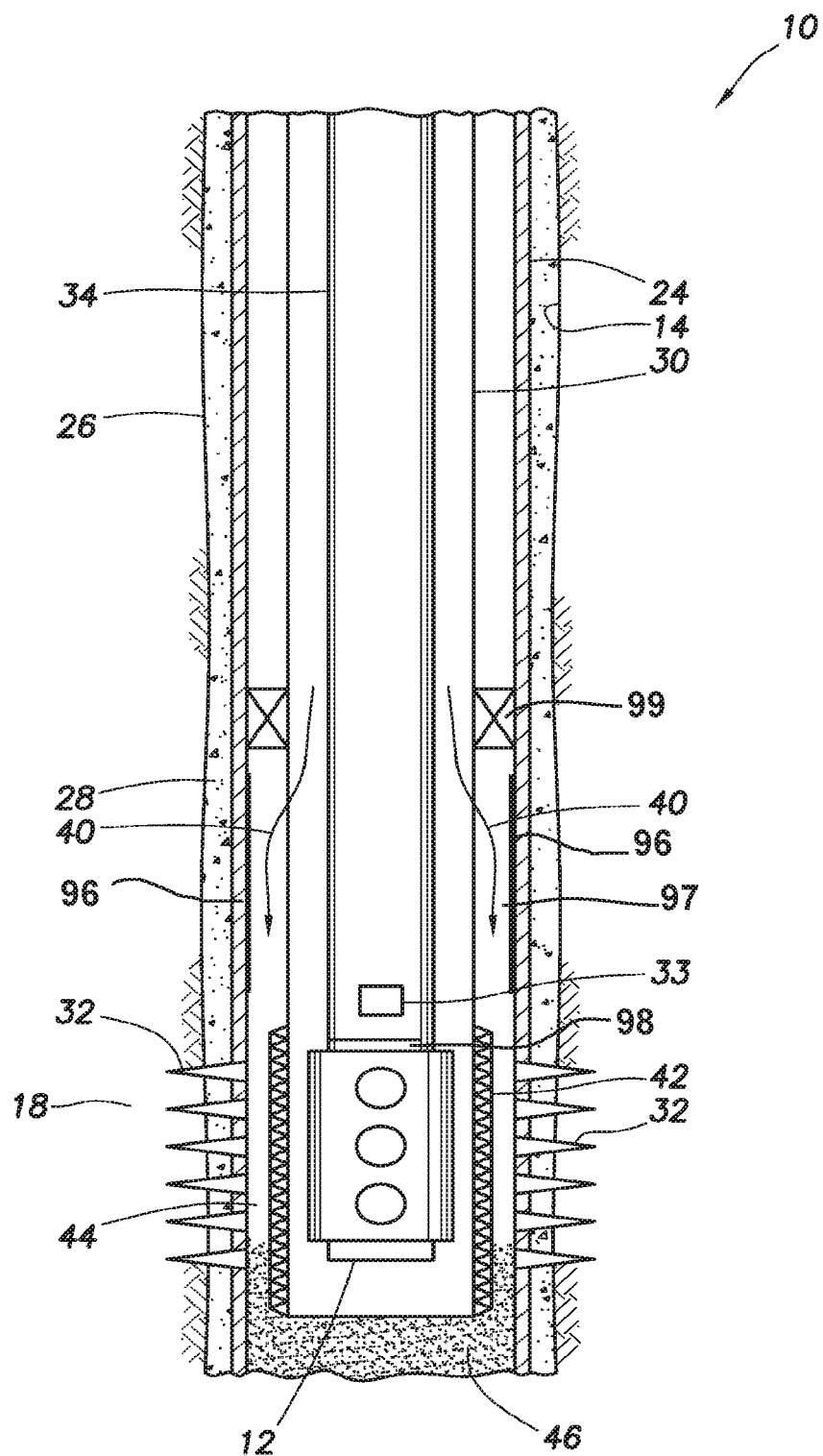
FIG. 10 is a schematic partially cross-sectional view of another configuration of the well system.

The acoustic generator 12 may include a vibration isolation device 98 of FIG. 3 and FIG. 10 (e.g., high damping material, or mechanical filter) between the acoustic generator and the string on which it is conveyed, to protect the string.

The acoustic generator 12 may be used in conjunction with an isolator section 96 of FIG. 3 and FIG. 10 of casing, or such section of other tubular strings, which are above or below the zone in which the device is intended to be used, to similarly reflect or attenuate the acoustic energy traveling up or down the wellbore with otherwise potentially negative effects.

Figure 5:
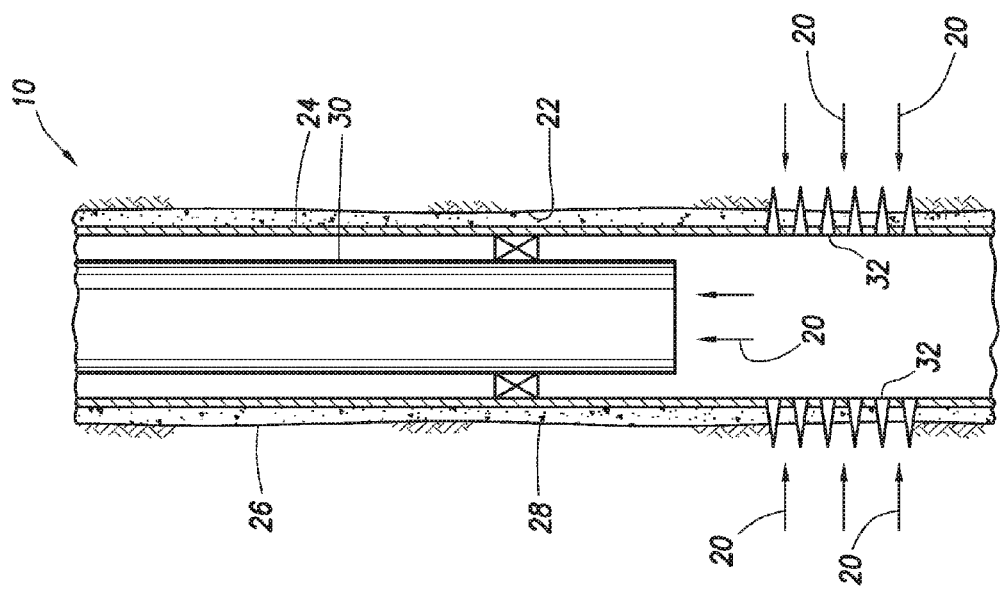
FIG. 5 is a schematic partially cross-sectional view of another configuration of the well system.
Figure 5:
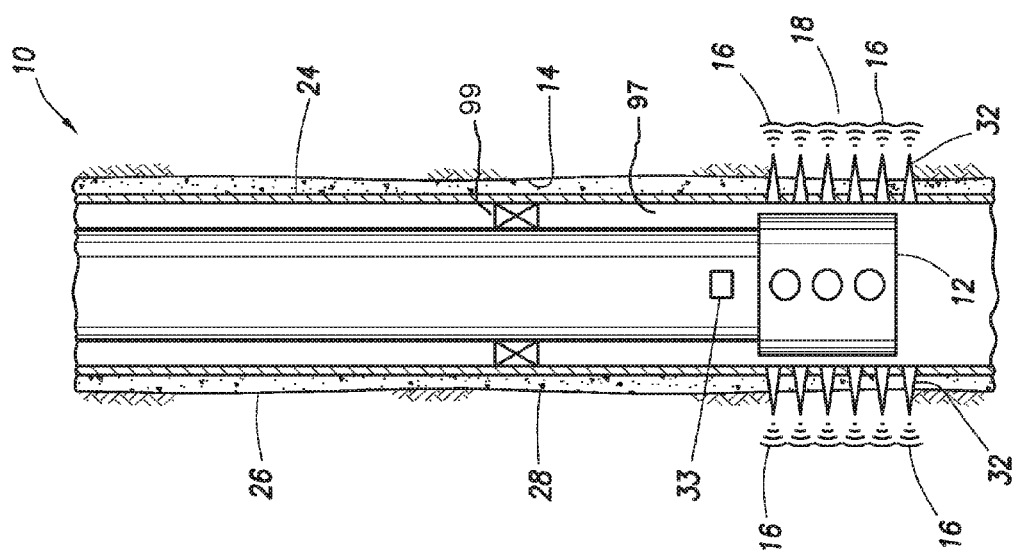

Elastomeric packers 99 of FIGS. 3, 5 and 10 may be preferred to bound the zone 97 of FIGS. 3, 5 and 10 being acoustically stimulated, with the packers having natural damping tendencies.

The system 10 may include one or more sensors 33 within, or proximate, or distant from, the acoustic generator 12 for real time feedback of its output, and/or vibratory response of intended target and/or of elements not intended to be excited, for real time tuning of amplitude, frequency, etc.

In steamflood or waterflood operations (or other types of conformance operations), use of the acoustic generator 12 can enhance distribution and penetration of the steam, water or other fluids through the formation 18. In that situation, the acoustic generator 12 could transmit the acoustic waves 16 into the formation 18 while the fluid (water, steam, etc.) is injected from the wellbore 14 into the formation.

Acoustic energy may be transmitted into the formation during a fracturing process which includes proppant, to increase depth of penetration and/or density of proppant (e.g. sand, ceramics, etc) into the fractures. This can result in increased or deeper propping and increased conductivity of the propped fractures.

Use of the acoustic generator 12 can enhance injectivity and distribution of certain treatment fluids within a reservoir matrix. A more uniform distribution of conformance (e.g., sealants, relative permeability modifiers, etc.) and/or acidizing chemicals would most certainly increase the overall effectiveness of the treatment process and reduce the chemical requirements.

In this case, the acoustic generator 12 could be deployed into the wellbore 14 using a jointed or coiled tubing workstring 34. The acoustic waves 16 could be transmitted into the formation 18 before the treatment fluid is pumped or in stages during the treatment process.

The acoustic waves 16 will agitate the surrounding matrix of the formation 18 which will ensure a more uniform distribution of the treatment/stimulation fluids. A similar process could be used in conjunction with a reservoir sweep process using water, natural gas or steam to effectively remove hydrocarbon fluids 20 from the reservoir porosity, which enhances the depletion efficiency.

Whether utilized for enhancement of production, injection, stimulation, or any other type of operation, the acoustic waves 16 can be "tuned" to a resonant frequency of the casing 24. For example, the acoustic generator 12 can be set to generate the acoustic waves 16 at a resonant frequency of radial and/or transverse modes of vibration for the casing 24. Preferably, the acoustic waves 16 are generated at a frequency which is at or below a resonant frequency of the casing 24.

In other examples, the acoustic generator 12 can be set to generate the acoustic waves 16 at a resonant frequency of the formation 18 fluid system (e.g., the pores in the formation rock, interconnecting passages, the fluid therein, etc.), at a resonant frequency of the formation rock itself, or at a frequency which results in maximum transfer of energy to an intended target. For example, if it is desired to transfer a maximum amount of acoustic energy to the formation 18, to the cement 26 (e.g., to reduce voids in the cement, to release a hardening agent into the cement, etc.) or to another element, the acoustic generator 12 can be operated to transmit a range or "sweep" of acoustic frequencies, and a sensor 33 (such as an accelerometer) can be used to determine which of the acoustic frequencies results in maximum transfer of acoustic energy to the element.

The sensor 33 can be used in any of the configurations of the well system 10 described herein. The sensor 33 can measure a response of any component of the system 10 (such as, the formation 18, the casing 24, the cement 26, a gravel pack, a well screen, etc.) to the transmitted acoustic waves 16.

Figure 4B:
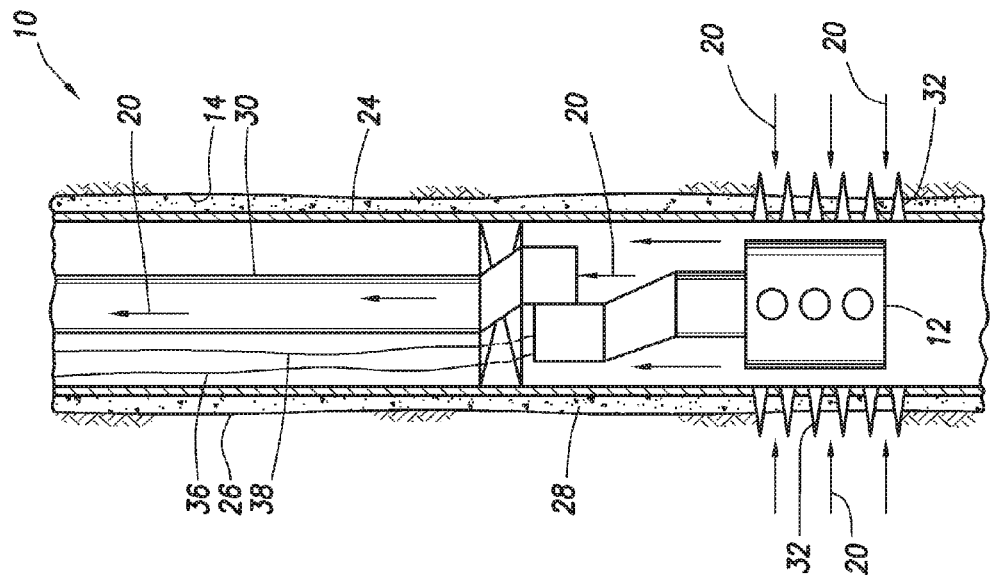
FIGS. 4A & B are schematic partially cross-sectional views of another configuration of the well system, with acoustic waves being transmitted into the formation in FIG. 4A, and fluid being received from the formation in FIG. 4B.
Figure 4A:
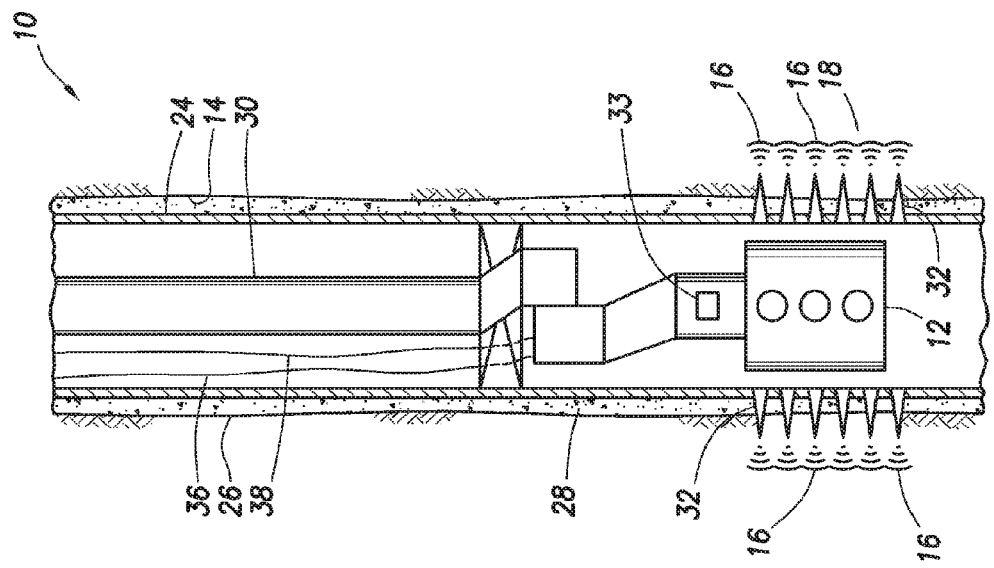

In FIG. 4A, the acoustic generator 12 is relatively permanently installed in the wellbore 14. The acoustic waves 16 are periodically transmitted into the formation 18 by the acoustic generator 12. When the acoustic waves 16 are not being transmitted, the fluid 20 is produced from the formation 18, as depicted in FIG. 4B.

Thus, stimulation of the formation 18 by the acoustic waves 16 is alternated with production of the fluid 20 from the formation, with the same wellbore 14 being used for deployment of the acoustic generator 12 and for production of the fluid 20. In other examples, the formation 18 may be stimulated by the acoustic waves 16 while the fluid 20 is produced. In further examples, separate wellbores 14, 22 may be used for deployment of the acoustic generator 12 and for production of the fluid 20.

In the system 10 of FIGS. 4A & B, the acoustic generator 12 is of the combustion type. Lines 36, 38 are used to flow fuel and oxidizer to the acoustic generator 12 from a remote location, such as the surface. The lines 36, 38 are depicted in FIGS. 4A & B as being positioned between the tubing 30 and casing 24, but they could be otherwise positioned (such as internal to the tubing, in a wall of the tubing or casing, etc.).

A suitable combustion-type acoustic generator is described in U.S. Publication No. 2009/0008088, the entire disclosure of which is incorporated herein by this reference. A steam generator which generates steam for use in generating acoustic signals 16 may be supplied with heat by, for example, combustion of fuel or electrical resistance heating.

In FIG. 5, the acoustic generator 12 is relatively permanently installed in the wellbore 14, and the fluid 20 is produced from an adjacent wellbore 22 via production tubing 30. The acoustic waves 16 may be continuously transmitted into the formation 18, or the acoustic waves may be periodically transmitted or pulsed.

In the above examples of the system 10, hydraulic fracturing may not be used at all to stimulate production of the fluids 20 from the formation 18. However, it is contemplated that benefits could be obtained by using the acoustic generator 12 to transmit the acoustic waves 16 into the formation 18, and then fracturing the formation hydraulically. For example, this may reduce the overall requirements for the fracturing operation (e.g., required water volume, pump horsepower, pressure, treatment fluids, etc.).

As other alternatives, the acoustic generator 12 could be operated to transmit the acoustic waves 16 into the formation 18 continuously from a wellbore 14 while fracturing operations are conducted from another wellbore 22 (e.g., using the system 10 configurations of FIGS. 3 and 5-9), or the acoustic generator 12 could be operated alternately with the fracturing and/or other stimulation operations.

One way that can enhance the excitation from one wellbore 14 to one or more adjacent wellbores 22 is through pore pressure relief. While stimulating via one wellbore, returns may be taken from an adjacent wellbore. This pore pressure relief phenomenon attracts the propagation plane toward that adjacent wellbore. Controlled pore pressure relief can enhance the effect of the acoustic waves 16.

Another application for the concepts of this disclosure is re-fracturing. This would be especially useful in hard-rock formations. After a well is initially fractured, oftentimes the zones need to be re-fractured later in the life of the well due to compaction, plugging, etc. The acoustic generator 12 can be used in a "re-fracturing" system to excite or re-excite an existing fracture geometry.

Another beneficial use for the acoustic generator 12 is in pin-point steam chamber development in steam-assisted gravity drainage (SAGD) wells. A problem in SAGD applications is that the existing lithology, pressure gradients, etc. dictate where the steam chamber development occurs across a long horizontal lateral. It usually occurs somewhere near the toe of the lateral and somewhere near the heal of the lateral.

However, by exciting the reservoir in several places across the lateral section, the position or areas where the steam chamber develops can be selected or enhanced. An example of this is depicted in FIG. 16, and is described more fully below.

In FIG. 10, the acoustic generator 12 is utilized during a gravel packing operation in the wellbore 14. During or after a gravel slurry 40 is flowed about a well screen 42 connected to the tubing string 34, the acoustic generator 12 is used to transmit acoustic waves into an annulus 44 between the screen and the casing 24 (or between the screen and the wellbore 14 if it is uncased) and thereby into a gravel pack 46 accumulated in the annulus. This aids in eliminating voids or preventing voids from forming in the gravel pack 46, and provides a more evenly distributed gravel pack about the screen 42.

In addition to better distribution and gravel compaction, the near-wellbore stimulation effect of the acoustic waves removes any skin from drilling mud, lost circulation material or perforating damage occurring prior to the gravel/proppant placement.

Figure 11:
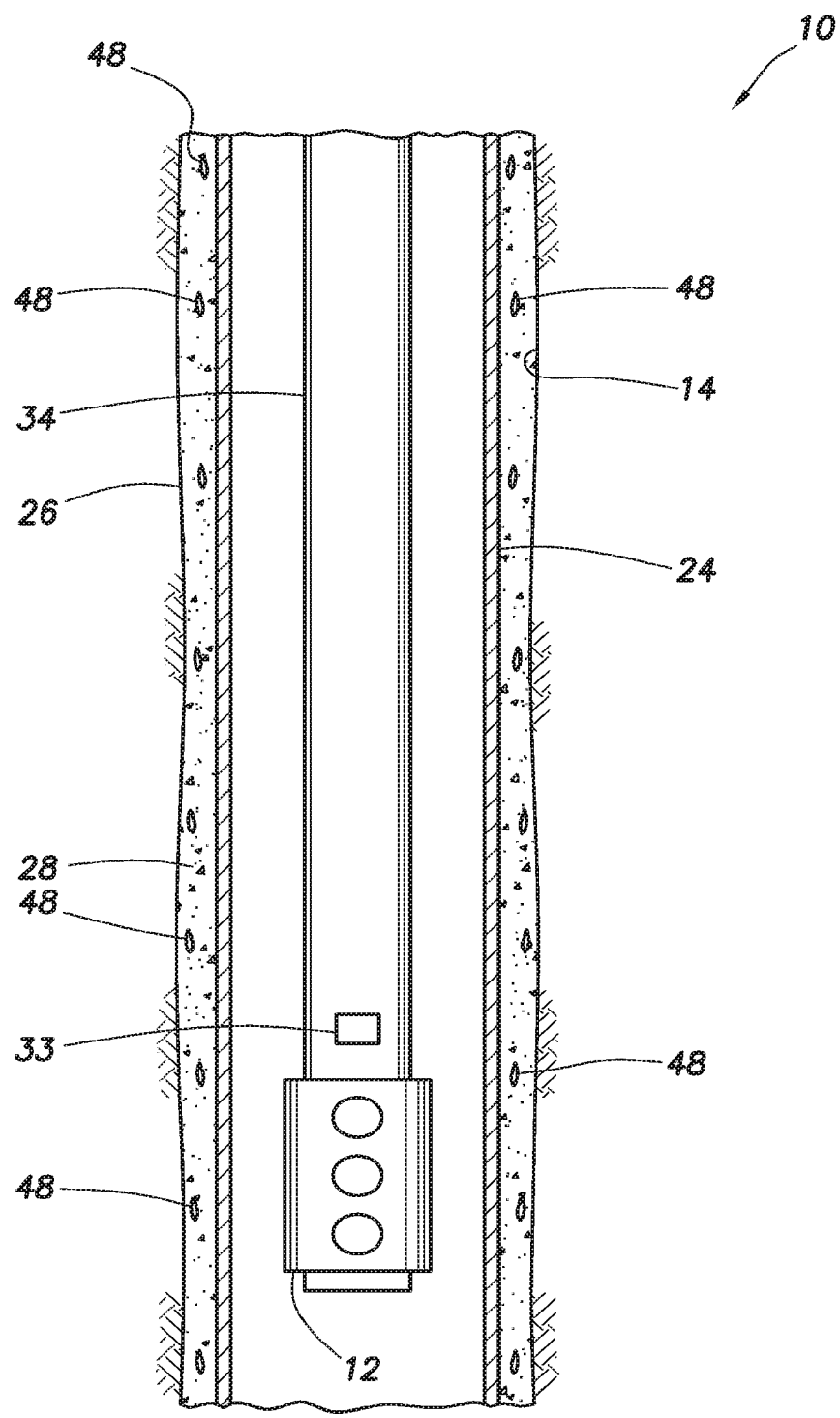
FIG. 11 is a schematic partially cross-sectional view of yet another configuration of the well system.

In FIG. 11, the acoustic generator 12 is utilized to initiate hardening or setting of the cement 26 after it has been flowed into the annulus 28 surrounding the casing 24. In this manner, the cement 26 does not harden until a point in time when such hardening is desired. Thus, the casing 24 can be repositioned, the cement 26 can be circulated out of the annulus 28, operational problems can be resolved, etc., prior to initiating hardening of the cement. This reduces or entirely eliminates the need for adding retardants to the cement 26 to delay full hardening of the cement.

Capsules or other containers 48 can be used to contain a hardening agent (such as a catalyst) for release into the annulus 28. For example, the containers 48 could be exteriorly attached to the casing 24, or the containers could be flowed into the annulus 28 with the cement 26.

Suitable containers would be glass bubbles of the type used in drilling mud for density control. Glass bubbles (HGS Series) are available from 3M Corporation of St. Paul, Minn. USA. Such glass bubbles could be filled with a catalyst or other hardening agent which causes the cement 26 to harden or set when the hardening agent contacts the cement.

When it is desired for the cement 26 to begin hardening, the containers 48 are opened by using the acoustic generator 12 to transmit acoustic waves to the containers. The containers 48 could be frangible, so that they break open when the acoustic waves are transmitted by the acoustic generator 12, or the containers could be otherwise configured to open when contacted by the acoustic waves.

The acoustic waves 16 can be "tuned" to a resonant frequency of the containers 48. Alternatively, the containers 48 could be designed so that they break or otherwise open when a certain frequency, combination of frequencies, or combination of stimuli (predetermined frequency or frequencies, pressure, etc.) are applied to the containers.

Even if the acoustic generator 12 is not used to initiate hardening of the cement 26, the acoustic waves 16 transmitted through the cement can still operate to reduce or eliminate voids and channeling in the cement, and to enhance bonding between the casing 24 and the cement. For this purpose, the acoustic generator 12 could be "tuned" to generate the acoustic waves 16 at a resonant frequency (or below a resonant frequency) of the casing 24.

Instead of (or in addition to) the containers 48, the casing 24 could be coated with the hardening agent. The casing 24 could be run into the well, the cement 26 could be pumped into place in the annulus 28, and then the hardening agent could be mixed with the cement using the acoustic waves 16 transmitted by the acoustic generator 12.

Thus, the hardening agent can be dispersed and mixed with the cement 26 using the acoustic generator 12, no matter what release mechanism (such as containers 48, coating on casing 24, etc.) is used. The hardening agent could also be released as a result of heating the cement 26 using the acoustic waves 16, as well as simply curing the cement using heat from the acoustic waves.

Figure 12:
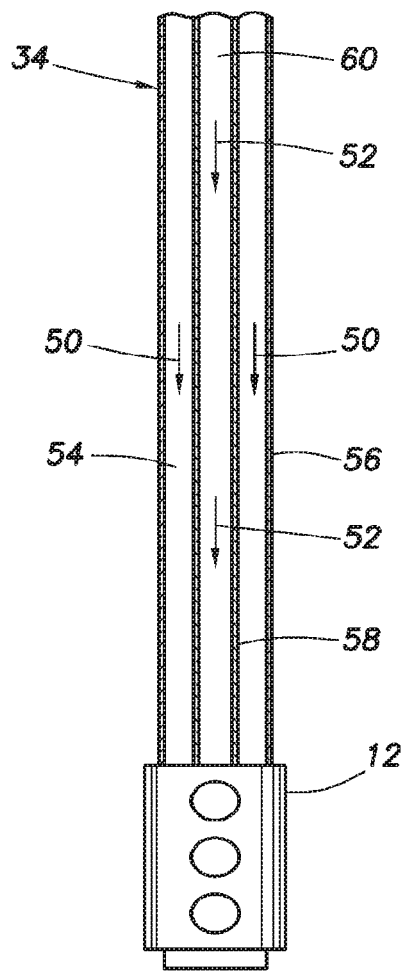
FIG. 12 is a schematic elevational view of a manner of delivering fuel and oxidizer to an acoustic generator in the well system.

In FIG. 12, the tubing string 34 used to convey the acoustic generator 12 into a well is also used to supply fuel 50 and oxidizer 52 to the acoustic generator, in the case where the acoustic generator is of the combustion type. As depicted in FIG. 12, the fuel 50 is flowed through an annulus 54 between an outer wall 56 of the tubing string 34 and an inner wall 58. The oxidizer 52 is flowed through a passage 60 extending longitudinally through the inner wall 58. Of course, the oxidizer 52 could be flowed through the annulus 54 and the fuel 50 could be flowed through the passage 60, if desired.

The configuration of FIG. 12 can be used either for transmitting the acoustic waves 16 at a single location in the wellbore 14, or for displacing the acoustic generator 12 along the wellbore while transmitting the acoustic waves.

Figure 13:
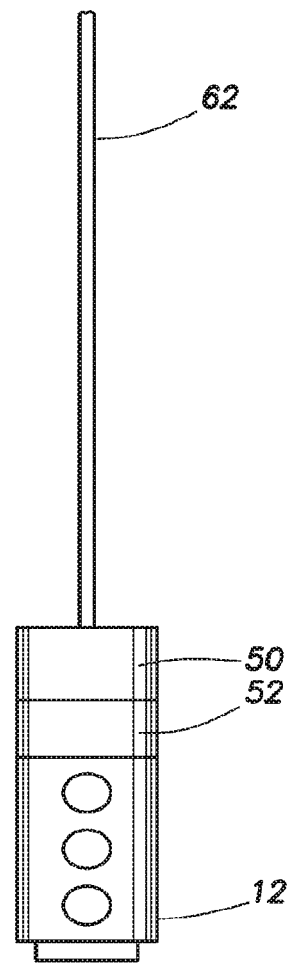
FIG. 13 is a schematic elevational view of another manner of delivering fuel and oxidizer to an acoustic generator in the well system.

In FIG. 13, the acoustic generator 12 is conveyed via a wireline 62, instead of the tubing string 34. The fuel 50 and oxidizer 52 are conveyed into the well along with the acoustic generator 12 (such as, in containers attached to the acoustic generator, etc.). This provides a self-contained acoustic wave generating system which is well suited for distributing acoustic waves over long distances along a wellbore, or for generating acoustic waves at one or more discrete locations along a wellbore.

Figure 14:
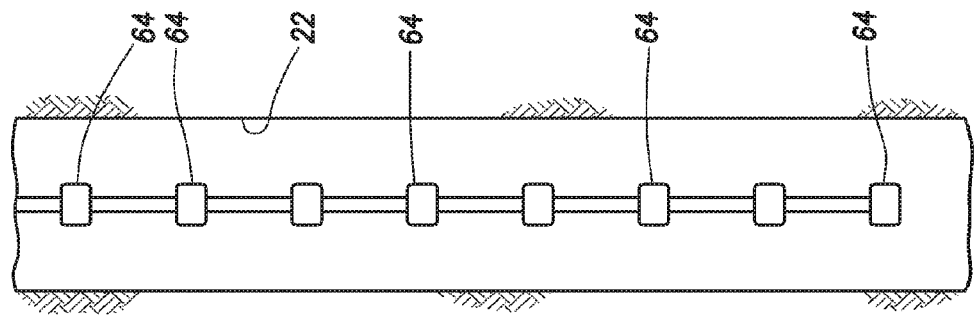
FIG. 14 is a schematic partially cross-sectional view of a further configuration of the well system.
Figure 14:
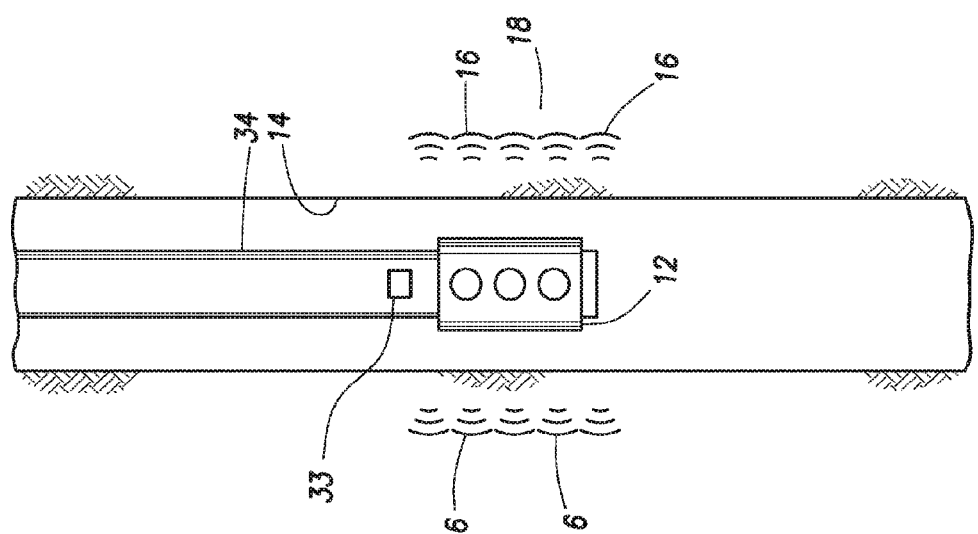

In FIG. 14, the acoustic waves 16 transmitted into the formation 18 are detected in the adjacent wellbore 22 by an array of sensors 64 distributed longitudinally along the wellbore. The sensors 64 may be of the type used in seismic imaging (e.g., the sensors could be geophones, hydrophones, accelerometers, or other types of sensors). In this manner, tomography of the formation 18 (e.g., to detect the presence and extent of fluid interfaces, fractures, faults, lithology, etc.) can be readily performed. It is contemplated that the presence and location of another wellbore, a drill string, etc. can even be detected using the acoustic generator 12 and sensors 64.

The acoustic generator 12 can be used in conjunction with vibratory source profiling or seismic profiling. The acoustic generator 12 can be displaced along the wellbore 14 while transmitting the acoustic waves 16 into the formation 18, if desired. The sensors 64 may alternatively be positioned at the earth's surface or sea floor, or in the wellbore 14.

The acoustic generator 12 may provide for mid-range imaging about the wellbore 14 (for example, greater than a meter from the wellbore), and the sensors 64 could be included with the acoustic generator or conveyed therewith, to provide a useful acoustic imaging tool.

Figure 15:
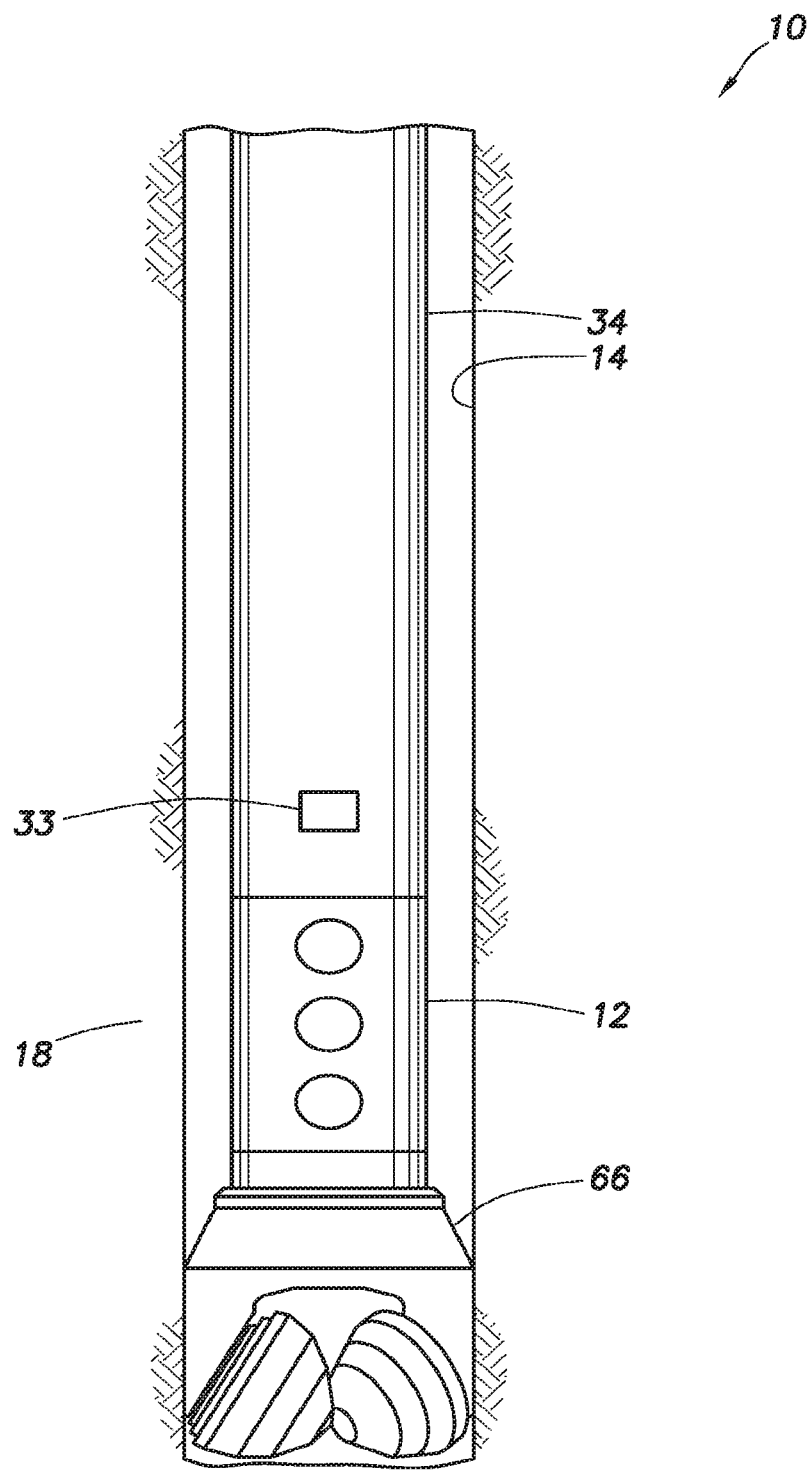
FIG. 15 is a schematic partially cross-sectional view of another configuration of the well system.

In FIG. 15, the tubular string 34 used to convey the acoustic generator 12 is a drill string. The wellbore 14 is being drilled as the acoustic generator 12 is transmitting the acoustic waves 16 into the formation 18. With the acoustic generator 12 positioned near the end of the drill string 34 (e.g., close above a drill bit 66 being used to drill the wellbore 14), the acoustic waves 16 can even be transmitted ahead of the bit, so that characteristics of the formation 18 ahead of the bit can be determined. Such characteristics can include presence and extent of fluid interfaces, fractures, faults, lithology, permeability, porosity, fluid type, etc.).

In FIG. 16, one or more acoustic generators 12 are used in a steam-assisted gravity drainage (SAGD) system. As depicted in FIG. 16, multiple acoustic generators 12 are positioned in the wellbore 14 used for injecting steam 70 into the formation 18.

The acoustic waves 16 generated by the acoustic generators 12 assist the steam 70 in penetrating the formation 18, so that a steam chamber 72 is formed with a desired shape and extent. As discussed above, it is common for a steam chamber to develop preferentially near the heel and toe of a SAGD injection wellbore However, using the principles of this disclosure, the shape and extent of the steam chamber 72 can be controlled as desired, for example, to enhance development of the steam chamber between the heel and toe (or at any other location, such as an area of relatively low permeability, etc.) along the wellbore 14. Any number, combination, spacing, etc., of the acoustic generators 12 may be used. Furthermore, the acoustic generators 12 may be used only in an injection wellbore (as depicted in FIG. 16), only in a production wellbore, or in a combination of injection and production wellbores.

In each of the above examples, the optimum acoustic characteristics (e.g., frequency, amplitude, duration, pulsing, frequency sweeps, multiple simultaneously transmitted frequencies, etc.) will be chosen for each operation. In the case of enhancing sweep efficiencies in conformance operations, optimum frequencies could provide a conductivity management system to enhance ultimate hydrocarbon recovery. As an alternative to hydraulic fracturing, micro-seismic monitoring technology could be deployed as a means to quantify and tune the effects and coverage of the acoustic energy field. In cementing operations, the up-hole cementing designs will preferably be engineered to withstand the acoustic energy output that is produced within the targeted hydrocarbon bearing reservoirs.

One of the possible benefits of the acoustic generator 12 is to reduce or eliminate the need for hydraulic fracturing. Another possible benefit is to excite the natural matrix in a hydrocarbon bearing formation 18 in order to enhance placement of treating chemicals and/or to increase hydrocarbon recovery from a reservoir. The acoustic wave generation processes should be an effective alternative to current technologies used in these types of applications.

Preferably, the acoustic generator 12 may have an acoustic power output of around 250 dB. Preferably, the acoustic generator 12 has a tunable output frequency, and may have multiple simultaneous frequency outputs. It is contemplated that acoustic frequencies in the hundreds of Hertz may be most useful for exciting the rock matrix of the formation 18, but it should be clearly understood that other frequencies may be used in keeping with the principles of this disclosure.

The acoustic energy may be used near a zone of production, or higher in the wellbore, semi-permanently for inhibition or as an intervention for remediation, for flow assurance problems such as hydrates, scale, wax, or asphaltine formations, in the near well production zone or in the completion or tubulars in the well.

The acoustic generator 12 may be capable of transmitting information (e.g., data, commands, etc.) as part of a telemetry system. For example, the acoustic generator 12 could transmit data regarding pressure, temperature, flow, formation characteristics, etc. during a stimulation, fracturing, treatment, conformance, production or drilling operation.

The data could be transmitted via frequency modulation (e.g., wherein a 0 bit is transmitted as one frequency, and a 1 bit is transmitted as another frequency), binary pulsing (e.g., wherein a 0 bit is indicated by presence of a frequency, and a 1 bit is indicated by absence of that frequency), or tone burst length modulation (e.g., wherein a 0 bit is indicated by transmission of a frequency for a predetermined time period, and a 1 bit is indicated by transmission of the frequency for another predetermined time period), or any other data modulation technique.

When being used to stimulate fluid flow in the formation 18, the acoustic generator 12 preferably provides sustained high frequency excitation. Excitation at a resonant frequency of the formation 18 with impedance matching may provide maximum energy transfer to the formation. Resonant frequencies of other elements of the system 10 may also be used (for example, resonant frequencies of the perforations 32, casing 24, containers 48, proppant particles in a fracturing operation, etc., or below such resonant frequencies), multiple resonant frequencies may be transmitted simultaneously or separately, and harmonic frequencies may be transmitted.

Resonant frequencies of the system 10 can be determined by transmitting a sweep of frequencies from the acoustic generator 12 and analyzing the response of the system. For example, the acoustic signal strength could be monitored from an adjacent wellbore, and maximum signal strength could correspond to maximum transmission of acoustic energy through the formation 18, whereas minimum signal strength could correspond to maximum absorption of acoustic energy by the formation. In some operations (such as data communication, formation tomography, etc.) maximum transmission of acoustic energy may be desirable, whereas in other operations (such as stimulation, conformance, etc.) maximum absorption of acoustic energy may be desirable.

The acoustic generator 12 may be "tuned" using other methods, as well. For example, where the acoustic waves 16 are transmitted in order to enhance production of fluid 20 from a formation 18 (such as, in any of the configurations of FIGS. 1-9 and 16), the acoustic generator 12 may generate multiple frequencies (or a sweep of frequencies) over time, and the production which results from these frequencies can be evaluated to see which frequency or frequencies generate (s) a maximum rate of production.

Metrics other than rate of production may be used to select an optimum frequency or frequencies for the acoustic waves 16. For example, a minimum ratio of drawdown or pressure differential from the formation 18 to the wellbore 14 or 22 to rate of production (drawdown/production rate), a minimum skin, and other metrics may be analyzed to indicate which frequency or frequencies should be transmitted by the acoustic generator 12 for optimum production results.

It may now be fully appreciated that the above disclosure provides many advancements to the art. In one example, the disclosure provides a well system and associated method in which an acoustic generator is used to excite a formation with acoustic waves transmitted from the acoustic generator.

The formation may be excited by the acoustic waves while a fluid is flowed into the formation. The fluid may include at least one of a stimulation fluid, a conformance fluid, a fracturing fluid and a treatment fluid.

The formation may be excited by the acoustic waves and then fluid (such as a hydrocarbon fluid) may be produced from the formation.

The acoustic waves may be transmitted at a resonant frequency of the system. The acoustic waves may be transmitted at a resonant frequency of the formation and/or a resonant frequency of an element (such as a casing, perforation, etc.) of the system.

The acoustic generator may be positioned in one wellbore, and fluid may be produced from the formation into another wellbore.

The acoustic waves may be transmitted into the formation from one wellbore, and the acoustic waves may be detected by at least one sensor positioned in another wellbore, at the earth's surface, at a sea floor, or in the first wellbore. Detection of the acoustic waves by the sensors provides indications of formation characteristics, such as presence and extent of fluid interfaces, fractures, faults, lithology, permeability and porosity.

The acoustic generator may be supplied with fuel and oxidizer via a tubing string, via lines interconnected to the acoustic generator, or via chambers conveyed with the acoustic generator.

The acoustic waves may be generated via combustion in the acoustic generator, generated hydraulically or generated electrically.

The acoustic generator may be positioned in a wellbore permanently or temporarily.

The acoustic waves may be detected and information may be thereby transmitted, with the information including at least one of data and commands.

The acoustic waves may be transmitted into the formation from one wellbore, and fluids may be produced from the formation from at least one other (second) wellbore. There may be multiple second wellbores positioned about the first wellbore.

The first and second wellbores may be generally horizontal or at least highly deviated. The first and second wellbores may be multilateral wellbores. The first and second wellbores may be positioned laterally adjacent each other.

The well system can include at least one sensor 33 which measures a response of the well system to the transmitted acoustic waves. The acoustic generator may transmit the acoustic waves at a frequency which maximizes the well system response.

The acoustic generator may transmit the acoustic waves at a frequency which maximizes production of fluid from the well system, at a frequency which minimizes skin in the well system, and/or at a frequency which minimizes a pressure differential from the formation to a wellbore for a given rate of production.

The acoustic waves may be used to increase development of a steam chamber in the formation.

Also provided by the above disclosure is a well system and associated method in which an acoustic generator transmits acoustic waves into cement surrounding a casing. The acoustic waves may cause at least one container to open, thereby initiating hardening of the cement. Opening of the container may release a hardening agent, such as a catalyst, into the cement. The container may be attached to the casing, or the container may be flowed into an annulus between the casing and a wellbore with the cement.

The acoustic waves may reduce or eliminate voids and/or channeling in the cement. The acoustic waves may provide for even distribution and bonding of the cement about the casing.

The acoustic waves may be transmitted at a frequency which is equal to or less than a resonant frequency of the casing. The resonant frequency may be in a radial or transverse mode of vibration of the casing.

The acoustic waves may be transmitted at a frequency which maximizes acoustic energy transfer to the cement.

The acoustic waves may be transmitted at a frequency which maximizes an output of a sensor 33 which senses a response to the acoustic waves.

Also described above is a well system and associated method in which an acoustic generator is used to transmit acoustic waves into an annulus surrounding a well screen during or after a gravel packing operation. The acoustic waves may operate to reduce voids in a gravel pack in the annulus. The acoustic waves may provide for even distribution of a gravel pack about the well screen.

The acoustic waves may be transmitted at a frequency which is equal to or less than a resonant frequency of the well screen. The resonant frequency may be in a radial or transverse mode of vibration of the well screen.

The acoustic waves may be transmitted at a frequency which maximizes acoustic energy transfer to a gravel pack in the annulus.

The acoustic waves may be transmitted at a frequency which maximizes an output of a sensor 33 which senses a response to the acoustic waves.

Also described above is a well system and associated method in which an acoustic generator is connected in a drill string in close proximity to a drill bit, the acoustic generator transmitting acoustic waves into a formation ahead of the bit. Characteristics of a portion of the formation ahead of the bit may be detected prior to the bit cutting into the portion of the formation. The formation characteristics may comprise at least one of presence and extent of fluid interfaces, fractures, faults, permeability, porosity, lithology, a wellbore or another drill string.

Also described above is a well system and method in which acoustic waves are transmitted into a formation during a fracturing process which includes proppant, increasing depth of penetration and/or density of proppant (e.g. sand, ceramics, etc.) flowed into the fracture(s), resulting in increased or deeper propping and increased conductivity of the propped fracture(s).

Also described above is a well system and method in which acoustic waves transmitted into a formation increase wetting and mixing of conformance agents such as relative permeability modifiers, thereby improving rejection of water and/or gas from entry to the near wellbore region or fractures in the formation and improving oil production or production ratios (hydrocarbons/water or oil/water).

Also described above is a well system and method in which acoustic waves are transmitted into a formation near a zone of production or higher, semi-permanently for inhibition or as an intervention for remediation, of flow assurance problems such as hydrates, scale, wax, or asphaltine formations, in the near well production zone or in a completion or tubulars.

Also described above is a well system and method in which a casing is coated with a hardening agent. The casing is run into the well, the cement is pumped into place in an annulus, and then the hardening agent is mixed with the cement using acoustic waves transmitted by an acoustic generator.

Also described above is a well system and method in which a hardening agent is dispersed and mixed with a cement using an acoustic generator, no matter what release mechanism is used.

Also described above is a well system and method in which a hardening agent is released as a result of heating a cement using acoustic waves, and/or curing the cement using heat from the acoustic waves.

Also described above is a well system and method in which, while stimulating via one wellbore, returns are taken from an adjacent wellbore, whereby pore pressure relief attracts a propagation plane toward the adjacent wellbore. Controlled pore pressure relief can enhance the effect of the acoustic waves.

Also described above is a well system and method in which, after a well is initially fractured, an acoustic generator is used to excite or re-excite an existing fracture geometry.

Also described above is a well system and method in which a formation is excited by acoustic waves generated by an acoustic generator in several places across a generally horizontal wellbore, whereby the position or areas where a steam chamber develops in a SAGD system is selected.

It is to be understood that the various examples described above may be utilized in various orientations, such as inclined, inverted, horizontal, vertical, etc., and in various configurations, without departing from the principles of the present disclosure. The embodiments illustrated in the drawings are depicted and described merely as examples of useful applications of the principles of the disclosure, which are not limited to any specific details of these embodiments.

Of course, a person skilled in the art would, upon a careful consideration of the above description of representative embodiments, readily appreciate that many modifications, additions, substitutions, deletions, and other changes may be made to these specific embodiments, and such changes are within the scope of the principles of the present disclosure. Accordingly, the foregoing detailed description is to be clearly understood as being given by way of illustration and example only.

What is claimed is:

1. A well system, comprising:
   an acoustic generator which transmits acoustic waves into an annulus surrounding a well screen;
   a vibration isolation device between the acoustic generator and a string on which the acoustic generator is conveyed; and
   an isolator section to reflect or attenuate acoustic energy associated with the acoustic waves.

2. The well system of claim 1, wherein the acoustic waves are transmitted as gravel is flowed into the annulus.

3. The well system of claim 1, wherein the acoustic waves are transmitted with gravel in the annulus.

4. The well system of claim 1, wherein the acoustic waves reduce voids in a gravel pack in the annulus.

5. The well system of claim 1, wherein the acoustic waves even distribute a gravel pack about the well screen.

6. The well system of claim 1, wherein the acoustic waves are transmitted at a frequency which is equal to or less than a resonant frequency of the well screen.

7. The well system of claim 6, wherein the resonant frequency is a resonant frequency of a radial mode of vibration of the well screen.

8. The well system of claim 6, wherein the resonant frequency is a resonant frequency of a transverse mode of vibration of the well screen.

9. The well system of claim 1, wherein the acoustic waves are transmitted at a frequency which maximizes acoustic energy transfer to a gravel pack in the annulus.

10. The well system of claim 1, wherein the acoustic generator is operable to transmit the acoustic waves at a frequency such that an output of a sensor that senses a response to the acoustic waves is at a maximum level.

11. The well system of claim 1, wherein the well system includes a set of sensors disposed such that at least one of the set of sensors is operable to provide feedback to tune an output of the acoustic generator.

12. The well system of claim 11, wherein the at least one of the set of sensors is operable to provide the feedback to tune the output of the acoustic generator in real time.

13. The well system of claim 11, wherein the feedback to tune the output of the acoustic generator is feedback to tune amplitude and/or frequency of the acoustic waves transmitted by the acoustic generator.

14. The well system of claim 1, wherein the isolator section includes an elastomeric packer.

15. The well system of claim 14, wherein the well system includes one or more additional elastomeric packers to bound a zone being acoustically stimulated.

16. The well system of claim 1, wherein the acoustic genera operable to transmit the acoustic waves tuned to a resonant frequency of a casing.

* * * * *